United States Patent
Pittroff

[11] 3,869,134
[45] Mar. 4, 1975

[54] PACKING SEALS
[75] Inventor: Hans Pittroff, Schweinfurt, Germany
[73] Assignee: SKF Industrial Trading and Development Company, Amsterdam, Netherlands
[22] Filed: Jan. 15, 1973
[21] Appl. No.: 323,660

[30] Foreign Application Priority Data
Jan. 19, 1972 Germany............................ 7201831

[52] U.S. Cl......................... 277/56, 277/67, 277/75
[51] Int. Cl............................................. B23p 11/00
[58] Field of Search .................. 277/56, 133, 67, 53

[56] References Cited
UNITED STATES PATENTS
| | | | |
|---|---|---|---|
| 945,180 | 1/1910 | Ljungström | 277/56 |
| 1,626,237 | 4/1927 | Hodgkinson | 277/53 |
| 1,895,348 | 1/1933 | Schlegel et al. | 277/56 |
| 1,925,898 | 9/1933 | Fritz | 277/56 |
| 3,739,444 | 6/1973 | Vargo | 277/56 |

Primary Examiner—Richard E. Aegerter
Assistant Examiner—John W. Shepperd
Attorney, Agent, or Firm—Murray Schaffer

[57] ABSTRACT

A sealing unit of the type described for use in packing shafts, rods or the like is formed of a pair of concentric rings annularly spaced from each other to permit passage of a lubricant therebetween. One of the rings has an annular groove facing radially along its edge toward the other ring. The other ring is formed of at least a pair of supporting disks between which is secured an elastic deflecting spacer member which is adapted to extend within the annular groove to thus deflect the lubricant.

7 Claims, 3 Drawing Figures

PATENTED MAR 4 1975 3,869,134

PACKING SEALS

BACKGROUND OF INVENTION

The present invention relates to sealing units such as labyrinth seals, glands and lubricating packings.

Sealing units of this type, generally referred to as labyrinth seals are used to seal or close off the ends of shafts, rods and the like journalled in more conventional supporting bearings. The known sealing units of this type comprise an annular body from which an annular disk like deflector extends into a groove formed in a surrounding retaining ring. It is conventional to secure the inner and outer members, i.e., the annular body and the surrounding retaining ring together. As a result the device is disadvantageously formed as a single unitary package, having limited sealing capacity, application and life.

It is the object of the present invention to provide a sealing unit of the type described which overcomes the disadvantages of the prior art devices.

It is an object of the present invention to provide a sealing unit of the type described which may be economically formed of several parts and which may be sequentially and/or simultaneously assembled in size required.

It is a further object of the present invention to provide a sealing unit of the type described which has improved sealing capacity.

The several objects as well as numerous advantages will be apparent from the disclosure of the present invention following herein.

SUMMARY OF THE INVENTION

According to the present invention, a sealing unit of the type described for use in packing shafts, rods or the like is formed of a pair of concentric rings annularly spaced from each other to permit passage of a lubricant therebetween. One of the rings has an annular groove facing radially along its edge toward the other ring. The other ring is formed of at least a pair of supporting disks between which is secured an elastic deflecting spacer member which is adapted to extend within the annular groove to thus deflect the lubricant.

The sealing unit according to the present invention is easily assembled by shoving one concentric ring into the other whereby the elastic spacer flexes and squeezes through the space until the rings are properly seated and then reflexes into its radial disposition. Thus, the space between the two concentric rings need be no larger than the thickness of the spacer.

Preferably, the supporting disks are of a size so that only two are sufficient to provide support and the proper thickness for the unit. If preferred, several units may be axially aligned. Also if preferred, the supporting disks may be made of a plurality of sheets, material laminated together. In either event elastic gaskets or washers are inserted between the disks and/or laminations and each of the rings are secured or fastened together to form unitary subassemblies.

The one ring which does not support the deflector spacer is provided with a plurality of discharge holes or bores communicating with the groove within the ring. Thus, the sealing unit may be installed about a shaft in any position or altitude and care need not be given to the disposition of a single discharge hole as in prior art devices.

Full details of the present invention are given in the following description and will be seen from the appended drawings to which reference is made in the description.

DESCRIPTION OF THE INVENTION

Figure 1:
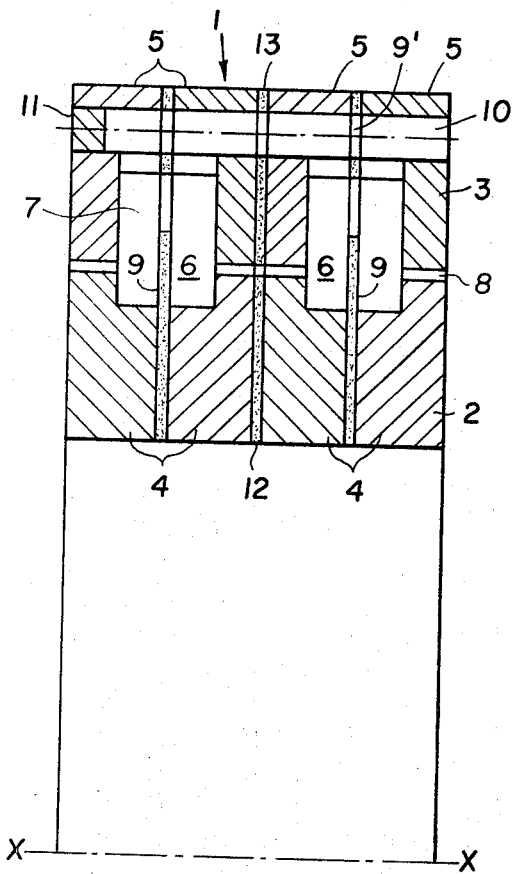
FIG. 1 is a section through a composite packing formed of two sealing units, each formed in accordance with the present invention.

FIG. 1 shows the axial arrangement of a pair of labyrinth sealing units, packing glands or lubricant seals each of which comprises an annular inner ring assembly 2 and an annular outer ring assembly 3 coaxial about the central axis X—X. The inner and outer assemblies are formed of a pair of non-deformable rigid supporting disks 4 and 5 respectively. The inner edges of the inner supporting disks 4 have a uniform smooth surface while the outer edges of the outer supporting disks 5 are similarly formed. However, the opposite facing edges of the supporting disks 4 and 5 are cutaway into an L-shaped configuration and axially placed next to each other in mirror image so that the L-shaped edges form communicating annular grooves 6 and 7 respectively. The supporting disks 4 and 5 of each assembly are radially spaced from each other to provide an annular crevice or slot 8 between them leading to the grooves 6 and 7 and serving as an inlet port for lubricant. Situated between the opposed frontal faces of the paired disks 4 is a spacer 9 forming a deflector or splash ring which extends radially outward and has a diameter large enough so that it extends through groove 6 into the groove 7 between the L-shaped sides of the opposing supporting disks 5 of the outer ring assembly. The splash spacer 9 is made of flexible and/or elastic material such as natural rubber, synthetic rubber or suitable plastic material. A similar spacer 9' is placed between the disks 5.

A plurality of axial discharge holes 10 are formed along the peripheral edge of the outer supporting disks 5. The holes 10 are adapted to be aligned axially and to communicate with the annular grooves 6 and 7 forming a direct conduit from the inlet 8. The aligned holes 10 are closed at one end (the left, as seen in the drawings) by a stopper 11. Between the opposing faces of each of the packings or glands themselves, are elastic spacers 12 and 13 aligned respectively with the inner and outer ring assemblies 2 and 3 allowing the crevice 6 between them to be free. The spacers 9 and 13 are provided with holes 10 so that the outer ring 3 has axial discharge bores from one end to another.

In the unit shown, which is made of two axially aligned glands or seal elements, oil or similar lubricant is fed into the crevice 8 from the right side. The lubricant passes on to the spacer 9 in the first or right hand pair of assemblies 2 and 3 and is then centrifugally deflected, due to the rotation of the packing with the shaft on which it is located, through the groove 7 outwardly of the discharge holes 10. If the pressure of the lubricant is great, then the lubricant passes also by the spacer 9 to the groove 7 in the left hand pair of ring assemblies, from which it is also deflected to the discharge holes 10. Depending upon the diameter of the element and particularly of the outer supporting disks 5, six or more discharge holes 10 can be arranged about the periphery. It is, therefore, not necessary during installation on the shaft to be concerned with specifically placing a single discharge hole at the gravitational lowermost position in the sealing unit, since the several holes about the periphery permit the return flow of lubricant independently of the position of the sealing unit at installation.

In assemblying the sealing unit itself, each pair of supporting disks 4 and 5 with the elastic spacers 9 and 9' are placed together. Thereafter the inner ring assembly 4 is shoved axially within the outer ring assembly 5. Since the spacer 9 between the supporting disks 4 is larger in outer diameter than the inner diameter of the supporting disks 5, the elastic spacer 9 flexes and is squeezed through the annular crevice or slot 8 defined between the inner and outer ring assemblies. Since the spacer 9 is flexible and elastic it will stretch without being damaged, scratched or otherwise deformed. When the two ring assemblies are shoved relatively to each other so that they are coaxial, the spacer 9 reflexes and assumes its radial position extending into the groove 7 as seen in FIG. 1.

Figure 2:
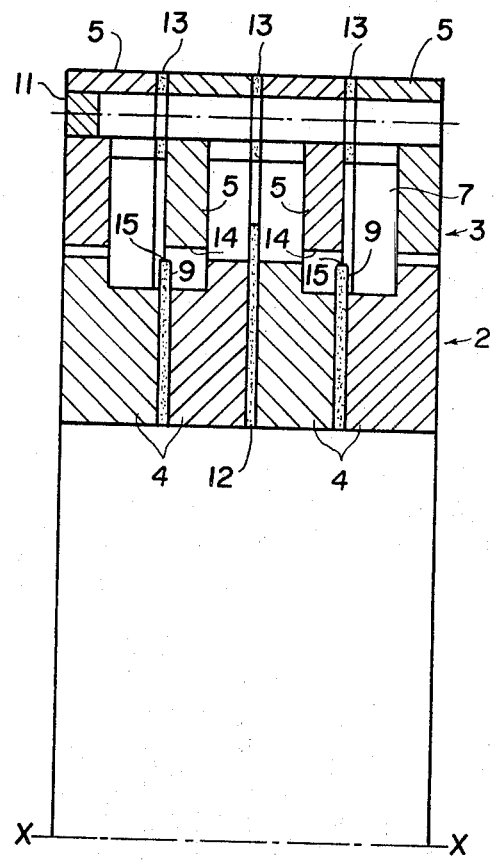
FIG. 2 is a view similar to FIG. 1 showing a modification of the ring structure.

In FIG. 2 a modification of the unit seen in FIG. 1 is shown wherein the device is only slightly changed by placing the interior ones of each pair of supporting disks 5 back to back with the exterior ones rather than in mirror image to them. In this embodiment the interior ones of the supporting disks thus form a wall 14, which lies opposite to the edge 15 of the annular flexible spacer 9. The flexible spacer 9 is, of course, smaller in diameter in this embodiment. However, should the flexible spacer 9 engage and ride about the edge of the wall 14 during operation then the wall would abrade the spacer and in a very short time reduce it in size so that only a very fine capillary crevice would be formed between them. This would advantageously provide a higher degree of sealing function during operation.

Figure 3:
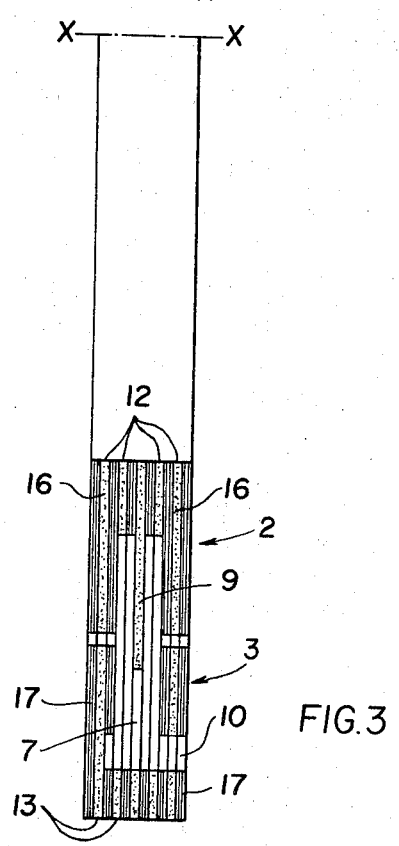
FIG. 3 is a view similar to FIG. 1 showing the laminar construction of a single sealing unit.

A still further modification of the device shown in FIG. 1 is depicted in FIG. 3, all within the scope of the present invention. The device of FIG. 3 is formed of laminations of several thin concentric sheets 16 and 17 similar to the concentric rings 4 and 5 of FIG. 1, between which spacers or gaskets 12 and 13, such as those used in the device of FIG. 1, are placed. The supporting disk assemblies of the lamellae formed by sheets 16 and spcers 12 and sheets 17 and spacers 13 respectively, can be obtained by welding, gluing or otherwise similarly fastening or adhering them together. Seen further in FIG. 3, the holes 10 are provided through lamination and spacer, although the leftmost radial outer sheet 17 is a flat unperforated disk, thus obviating the need to supply a separate cap or stopper for discharge hole 10 as provided otherwise in FIG. 1.

From the foregoing it will be seen that the sealing unit is formed from two concentric ring assemblies spaced from each other so that they are not in frictional engagement, and having oppositely facing annular grooves. Although the embodiments show the inner ring assembly as mounting the splash or deflecting spacer 9, it will be obvious that it may be mounted on outer ring assembly as well. In any event, according to the present invention, the deflector spacer comprises an elastic gasket like flat disk which is mounted between two supporting disks and has a diametric dimension larger than the supporting disks so that it will extend within a space formed oppositely to it in the other of the concentric ring assemblies. The crevice between the inner and outer ring assemblies need be no larger than the thickness of the elastic spacer itself, since the elastic spacer will flex, stretch and otherwise easily pass through such a crevice. This flexing occurs for only a very short time and then the spacer because of its own inherent spring like characteristic will spring back into its shape of a flat disk like member, taking a radially planar disposition. Natural, synthetic rubber, resins and plastics are economical and highly suitable to be used in this application. It is preferably, to form the supporting disks holding the deflector spacer so that an annular space exists to both sides of the spacer. This enables the spacer to flex at a root deeper than the crevice to which it passes allowing less strain to occur on the material so that the spacer is not nicked, scratched or otherwise damaged when it is forced through the spacer.

As seen in FIG. 3, it may sometimes be preferred to form the supporting ring assembly from several laminations of sheet material. This permits inexpensive sheet metal or plastic parts to be used although in the embodiment of FIGS. 1 or 2 the more substantial supporting disks themselves are very economical. The several laminations of FIG. 3 or the disks of FIGS. 1 or 2 are economically separated by washer disks or gaskets of elastic, or compressible material conventionally used. In either of the embodiments the several parts lend themselves to standardization and mass production. They can be sized and dimensioned easily to standard ball or roller bearings used in the journalling of shafts etc., which are themselves standard.

The several parts forming each unit can be held together by being glued, vulcanized in unity, rivetted together, welded or otherwise fastened into its unitary form. The axial extent fo a sealing element for any particular purpose can be varied as desired by arranging the ring assemblies in any multiple. While two are shown in FIGS. 1 and 2, it will be obvious that any number may be axially aligned to fill any space requiring packing. A further advantage is obtained from the construction wherein a plurality of discharge holes are provided about the periphery of the ring assembly not supporting the deflector spacer. The sealing element may thus be installed with greater ease and with less skill required since the discharge port for the lubricant need no longer be precisely located in any given or fixed position.

From the foregoing it will be seen that the objectives of providing a sealing unit which may be easily constructed, assembled and installed have been met. The sealing unit may be assembled of several parts placing each in sequence or simultaneously into position. In all instances, however, improved sealing and working capacity is obtained.

Several modifications, changes and embodiments have been discussed. Others will be obvious to those skilled in this art. It is therefore, intended that the present disclosure be taken as illustrative and not as limiting of the scope of the invention.

What is claimed:

1. A seal unit for rods, shafts and the like comprising a pair of concentric rings annularly spaced from each other for the passage of lubricant, the outer ring having an annular groove along its edge facing the inner ring along its periphery and at least one bore along its periphery communicating with said groove and opening axially outwardly of said ring for discharge of lubricant, the inner ring being formed of at least a pair of supporting disks and a flexible deflecting spacer located therebetween and being adapted to extend radially into said annular groove spaced from the sides thereof to deflect the lubricant to the periphery thereof into said bore.

2. The seal according to claim 1 wherein said inner ring is provided with an annular groove on each side of said deflecting spacer.

3. The seal according to claim 1 wherein the space between the concentric rings has a width no greater than the thickness of the deflecting spacer.

4. The seal according to claim 1 wherein at least two pair of concentric rings are aligned axially and are provided with elastic gaskets therebetween having holes aligned with said bore.

5. The seal according to claim 1 wherein the supporting disks are formed of a plurality of sheet like disks laminated together.

6. The seal according to claim 1 wherein the outer ring is formed with a plurality of openings extending axially outwardly thereof and spaced along the periphery thereof.

7. The seal according to claim 1 wherein said deflecting spacer has a diameter larger than that of said supporting disks.

* * * * *